United States Patent
Bowater et al.

(10) Patent No.: US 7,877,498 B2
(45) Date of Patent: Jan. 25, 2011

(54) METHOD AND ARCHITECTURE FOR PROCESSING RTP PACKETS

(75) Inventors: Ronald John Bowater, Hampshire (GB); Raymond Jepson, Hampshire (GB); Yuk-Lun Wong, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/421,094

(22) Filed: May 31, 2006

(65) Prior Publication Data

US 2006/0282543 A1      Dec. 14, 2006

(30) Foreign Application Priority Data

Jun. 11, 2005    (GB) .................................. 0511920.1

(51) Int. Cl.
*G06F 15/16*      (2006.01)
(52) U.S. Cl. ..................... 709/231; 370/221; 370/225; 370/228

(58) Field of Classification Search ................. 709/231; 370/221, 225, 228
See application file for complete search history.

(56) References Cited

U.S. PATENT DOCUMENTS

| | | | |
|---|---|---|---|
| 6,389,473 B1* | 5/2002 | Carmel et al. ............... | 709/231 |
| 7,116,894 B1* | 10/2006 | Chatterton .................. | 386/95 |
| 2004/0267940 A1* | 12/2004 | Dideriksen et al. .......... | 709/228 |
| 2006/0013321 A1* | 1/2006 | Sekiguchi et al. ...... | 375/240.27 |

* cited by examiner

*Primary Examiner*—Yves Dalencourt
*Assistant Examiner*—Michael C Lai
(74) *Attorney, Agent, or Firm*—Law Office of Jim Boice

(57) ABSTRACT

The invention streams data by identifying an existing streaming data channel and disabling the channel so that data can not be streamed; breaking the channel to form at least one pair of channel connection points; connecting at least one streaming data plug-in between the connection points; and enabling the channel so that streaming data can flow through the channel via the plug-in, wherein the at least one plug-in can process the streaming data as it flows trough the channel.

13 Claims, 3 Drawing Sheets

METHOD AND ARCHITECTURE FOR PROCESSING RTP PACKETS

CLAIM FOR FOREIGN PRIORITY

The application claims the foreign priority benefits under 35 U.S.C. §119 (a)-(d) or (f), or 365 (b) of Great Britain Application Serial Number 0511920.1 filed Jun. 11, 2005.

This invention relates to a method and apparatus and architecture for processing RTP packets.

BACKGROUND

The voice processing industry is moving from 'circuit-switched' voice communication to 'packetized' voice communication. In technical terms this move is from digitized voice sent sample by sample at a fixed rate over dedicated digital channels to digitized voice collected together in packets of data and then sent over a communication channel that may be shared between large numbers of individual users. The Internet Engineering Task Force (IETF) have developed protocols to define how voice should be sent and received over packetized voice channels and the most well known of these is Real Time Protocol (RTP) that was defined in IETF Request for Comments (RFC) 3550.

RFC 3550 defines the way in which voice is sent using RTP over a User Datagram Protocol (UDP) connection rather than a TCP connection. TCP is not appropriate for real-time communication as the need to retain all packets at the transmitter until acknowledged by the receiver would cause unacceptable memory, latency and processing overheads. UDP is not inherently a reliable protocol as there are no built-in mechanisms to prevent voice packets being a) lost completely or b) received out of order. However, using some header fields added to the basic payload, and making the assumption that voice is a QUALITITIVE data type where absolute perfection is not required, RTP provides the means by which an original audio stream sent using UDP can be reasonably recreated in the presence of missing, delayed and out of order packets.

Processing of incoming and outgoing audio packets to support RTP is a complex matter, especially when some other requirements are taken into account. These include: 1) the ability to specify the encoding (codec) to be used both by the application and the actual RTP data itself; 2) the need to be able to dynamically change operating parameters based upon, for example, packet loss; and 3) the requirement to be able to send the recovered audio from an incoming RTP stream to multiple sinks (e.g. to a voice recorder, a voice recogniser and a debug recording tool).

SUMMARY OF INVENTION

According to one aspect of the invention there is provided a method for controlling streaming data in a streaming data engine comprising: identifying an existing streaming data channel and disabling the channel so that data can not be streamed; breaking the channel at least at one point to form at least one pair of channel connection points; connecting at least one streaming data plug-in between the at least one pair of connection points so that the channel is remade; and enabling the channel so that streaming data can flow through the channel via the at least one plug-in wherein the at least one plug-in can process the streaming data as it flows trough the channel. Preferably the attaching step is performed at execution time using a function call.

This allows one or more plug-ins functionally complementary to each other to process streaming data on an existing channel. Furthermore each plug-in can be configured, modified or replaced during streaming of data.

Advantageously, if the plug-in or plug-ins attached to the streaming engine do not comply with one or more plug-in configuration rules then the method includes detaching the plug-in or one of the plug-ins and attaching a new plug-in or new plug-ins to define a new plug-in set that complies with the plug-in configuration rules. This step is performed before the channel is opened and may be initiated by attaching a plug-in or attempting to open a channel. Each plug-in set is defined for a specific function.

More advantageously, the method further comprises: if the plug-in or plug-ins attached to the streaming engine do not comply with one or more plug-in optimize rules then detaching the plug-in or one of the plug-ins and attaching a new plug-in or new plug-ins that comply with the optimization rule. This step is performed before the channel is opened and may be initiated by attaching a plug-in or attempting to open a channel. The optimized plug-in configuration may include a buffer plug-in for caching streaming data to minimize the number of conversions to be performed for multiple outputs.

A plug-in may be an input plug-in for manipulating streaming data at an input to the streaming engine. A plug-in may be an output plug-in for manipulating the streaming data at an output to the streaming engine. A plug-in may be a buffer plug-in for buffering streaming data between an input and output of the streaming engine.

A plug-in may be a mixer plug-in for connecting and mixing one or more streaming channel inputs with one or more streaming channel outputs. A mixer plug-in can split a single streaming channel input into multiple channels of output. Each output plug-in has a different rate of manipulating the streaming data and there the different output data streams can be staggered with respect to each other. The embodiment removes the staggering by allowing the mixer plug-in to receive manipulation times from each output plug-in and then delay output plug-ins by an appropriate amount of time. The mixer plug-in can mix multiple channels of input into a single channel of output. The mixer plug-in may have more than one output plug-in, in which case the method further comprises selecting the output plug-in appropriate to the input data stream.

This invention proposes a software architecture by which an application can construct and control processing on inbound and outbound audio packets and is implemented in the WVR? MRCP (Media Resource Control Protocol) support and is known as RTSE (Real Time Streaming Engine).

The concept of the pluggable RTSE architecture is to provide an object-oriented framework that allows RTP processing to be performed on incoming and outgoing audio streams. The concept is based around a central RTSE object with sockets for 'pluggable' input and output endpoints and also pluggable buffer elements.

Further advantages of the pluggable RTSE are:
1) A flexible framework for processing of RTP media data.
2) Encapsulated 'codecs' i.e. conversions are done implicitly and automatically by the endpoints depending upon the format of data supplied or requested by the RTSE, the application or network.
3) Optimized codec conversion using data caching to minimize the number of codec conversions required.

DESCRIPTION OF DRAWINGS

Embodiments of the invention will now be described, by means of example only, with reference to the accompanying drawings in which.

DESCRIPTION OF THE EMBODIMENTS

Figure 1:
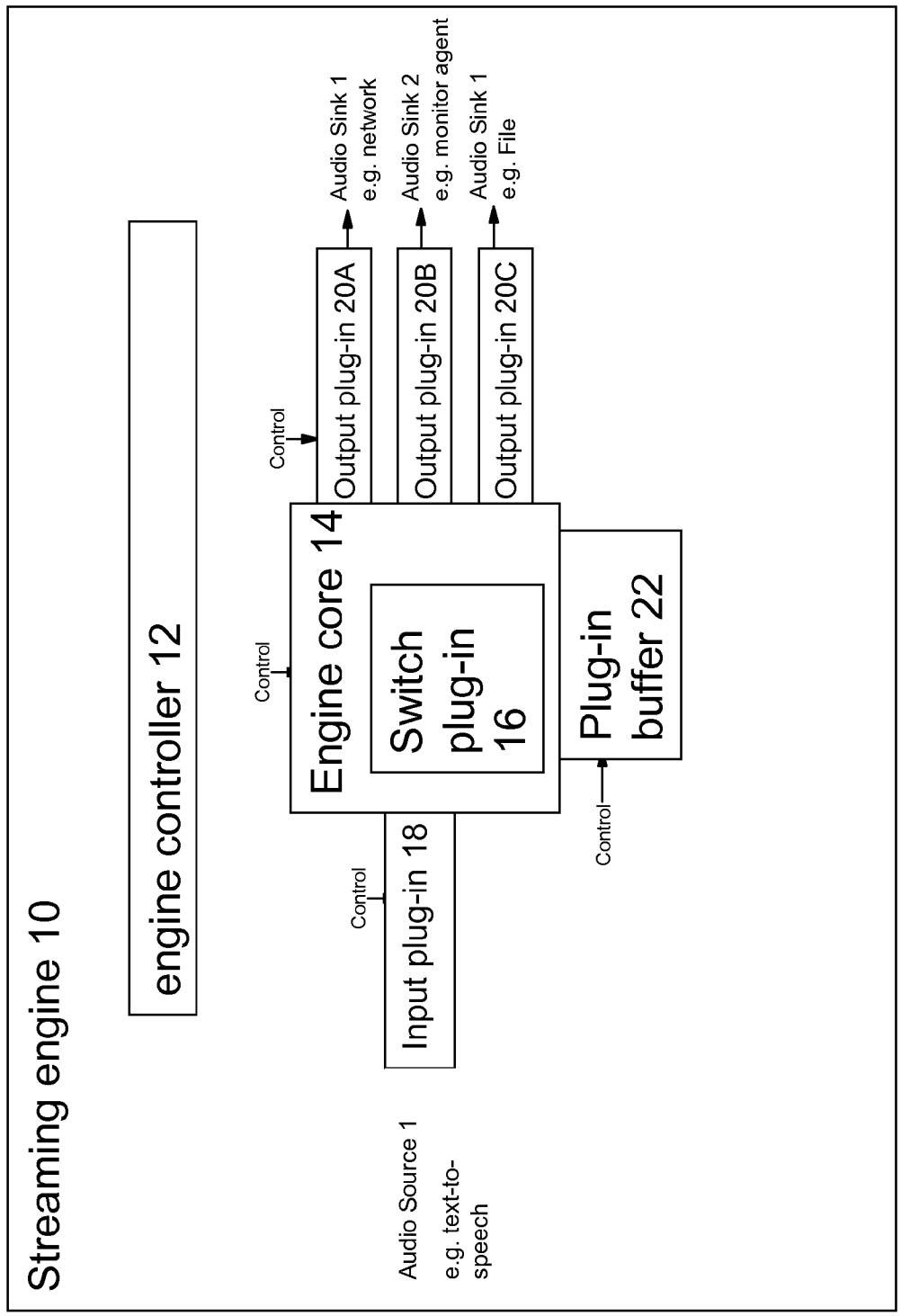
FIG. 1 shows an example block diagram of the streaming engine with a set of plug-ins.

FIG. 1 is a schematic of a streaming engine 10 according to the present embodiment comprising: an engine controller 12; an engine core 14; a switch plug-in 16; a buffer plug-in 22; input plug-in 18; and three output plug-ins 20A, 20B and 20C. The streaming engine 10 typically sits between two computer applications and processes data sent between the two. This configuration of the plug-ins is an example, but all configurations will have an input plug-in and an output plug-in, most will also have a switch plug-in and a buffer plug-in.

RTSE architecture provides an object-oriented framework that allows RTP processing to be performed on incoming and outgoing audio streams in the streaming engine. The engine core 14 is a central RTSE object that supports the concept of 'pluggable' input and output endpoints (input plug-ins 18 and output plug-ins 20) and also pluggable buffer 22 and switch elements 16 (all generically called plug-ins in this specification). The engine core 12 provides the focal point for all the plug-ins 16, 18, 20 and 22 and comprises multiple sockets for the different types of plug-in. In the present embodiment we have four types: an input plug-in 18; an output plug-in 20; a switch plug-in 16; and a buffer plug-in 22. When a plug-in is connected to the engine core 14, a socket must be configured so that a connection path is maintained through the streaming engine 10. An input socket is configured on connection to point both at an input plug-in 18 and at the engine core destination address of the input plug-in 18, e.g. a switch socket, buffer socket or output socket. A switch socket is pointed to from an input socket or from a buffer socket and is configured on connection to point at the input of a switch plug-in 16, an output of the switch plug-in 16 and an output socket or a buffer socket. A buffer socket is pointed to from an input socket or from a switch socket and is configured on connection to point at the input of a buffer plug-in 22, an output of the buffer plug-in 22 and an output socket or a switch socket. An output socket is pointed to by input, switch and buffer sockets and configured on connection to point at an output plug-in 20. The directions and manner of the references are examples for this embodiment and are not part of the invention.

A plug-in is a software object that processes packetized data (e.g. audio and video) flowing through the streaming engine 10. The data is not necessarily in real time, but it is necessary for it to be packetized.

Input and output plug-ins perform processing on the streaming data. In the preferred embodiment one of an input or an output plug-in can perform the processing and the other plug-in can act as a conduit, as this gives the most flexibility when configuring a streaming engine. Alternatively, both plug-ins can act on the data or the processing can be performed by the switch plug-in 16 or plug-in buffer 22. The plug-in that performs the processing is called the active plug-in. In many examples it does not matter whether it is the input or output plug-in that is the active plug-in. Input and output plug-ins can handle multiple data types on the same streams. For example, this would allow simultaneous audio and video to be taken in from the same input plug-in and split into the different data types for different output plug-ins for audio and video. Other payload types such as Dual Tone Multi Frequency (DTMF) data and Distributed Speech Recognition (DSR) data could be similarly handled.

A switch plug-in 16 is positioned between an input plug-in 18 and output plug-in 20 for splitting one stream into multiple streams or combining separate streams into a single stream, A buffer plug-in 22 is positioned between an input plug-in 16 and output plug-in 18 for buffering the streaming data. Different buffer plug-ins can be used depending on the application.

Figure 2:
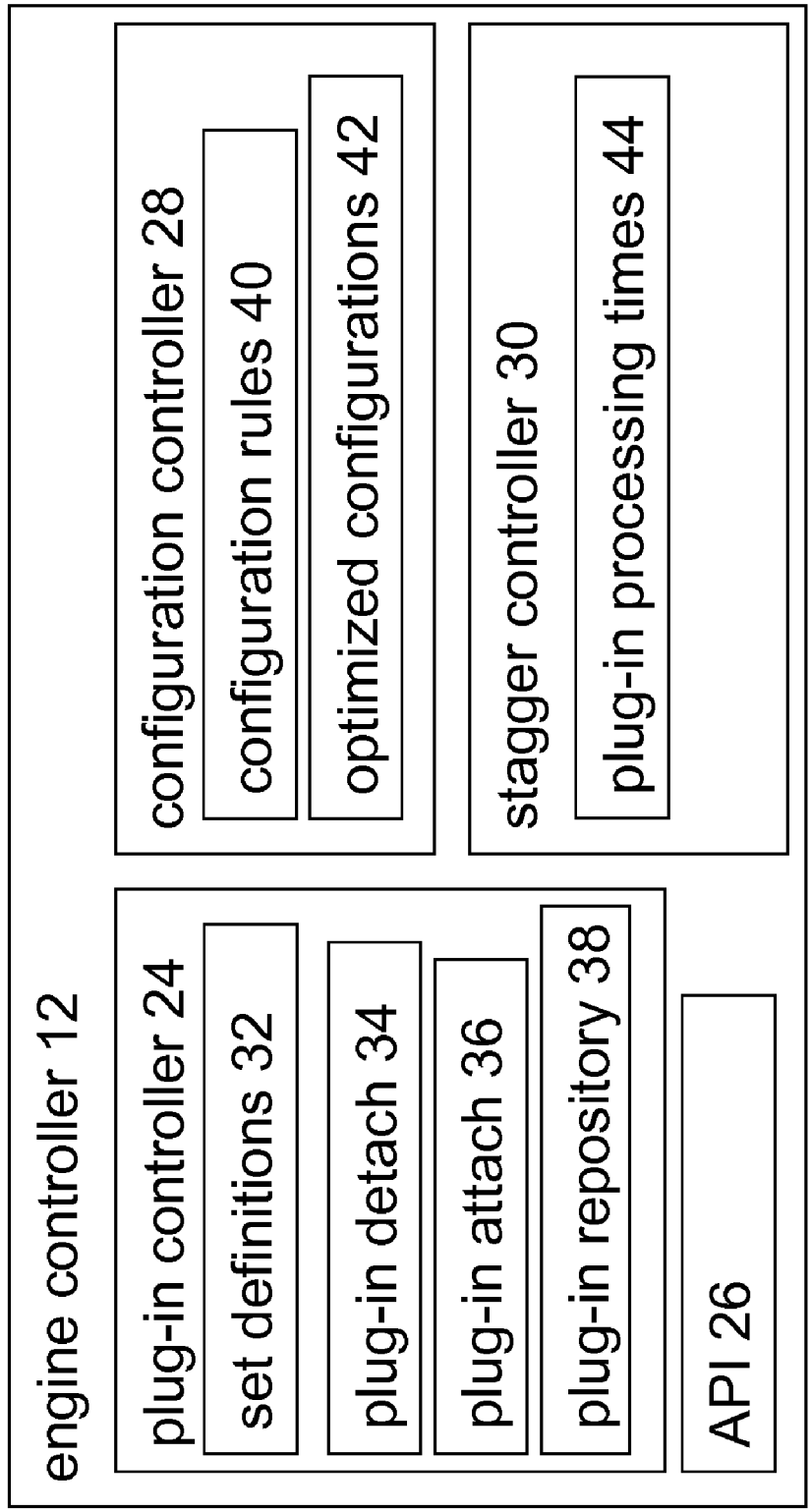
FIG. 2 is a schematic of a streaming engine controller according to the present embodiment.

The engine controller 12, shown in more detail in FIG. 2, comprises: plug-in controller 24; an application programming interface (API) 26; a configuration controller 28; and a stagger controller 30.

The API 26 allows control of the engine core 14 (through the engine controller) to be passed to another application. For instance, a VoiceXML application running on a interactive voice response system may wish to change the configuration of the plug-ins. In this embodiment the streaming engine is controlled by a built-in engine controller, but external control is also possible through the application interface that forms part of the engine controller in this embodiment.

The plug-in controller 24 comprises: plug-in set definitions 32; plug-in detach function 34; plug-in attach function 36; and a plug-in repository 38. The plug-in repository 38 stores each of the plug-in classes. Each time a plug-in is required then the plug-in attach function 36 is called with the name of the plug-in and the connection points. The plug-in attach function 36 instantiates a plug-in object and connects the plug-in to the physical endpoints in system memory corresponding to the connection points. The plug-in detach function 34 is called with the name of a plug-in and removes that plug-in from system memory. The attach function 36 and detach function 34 also work with sets of plug-ins. These sets of plug-ins are defined in the plug-in set definitions 32.

The configuration controller 28 ensures that data is always processed in the correct way with regard to the input and output plug-ins. Configuration rules 40 define that certain input plug-ins require certain other plug-ins, for instance, an inbound RTP input plug-in requires a jitter buffer, if the inbound plug-in set does not have a jitter buffer then the configuration controller itself will attach a jitter buffer plug-in to the plug-in set as directed by the configuration rules 40.

Furthermore the configuration controller 28 ensures that data is always processed in the most efficient way with regard to packet size and coding (e.g. A or mu-law). The configuration controller ensures that optimizations as defined in optimized configurations 42 are followed. For example, the configuration controller 28 configures the engine core 14 and a plug-in set 32 to cache data as defined by the optimized configurations 42 to minimize the number of conversions to be performed for multiple plug-ins.

The stagger controller 30 is used to align the data streams for different output plug-ins to be in phase. For each plug-in there exists a time taken for processing data. In this embodiment this processing time is stored in a table for plug-in processing time 44. The stagger controller 30 locates, in a group of output plug-ins, the output plug-in with the longest processing time and then delays the sending of the data to the remaining output plug-ins by an amount to bring all outputs into line. In this embodiment the data streams for the remaining output plug-ins are directed into delaying buffer plug-ins.

Figure 3:
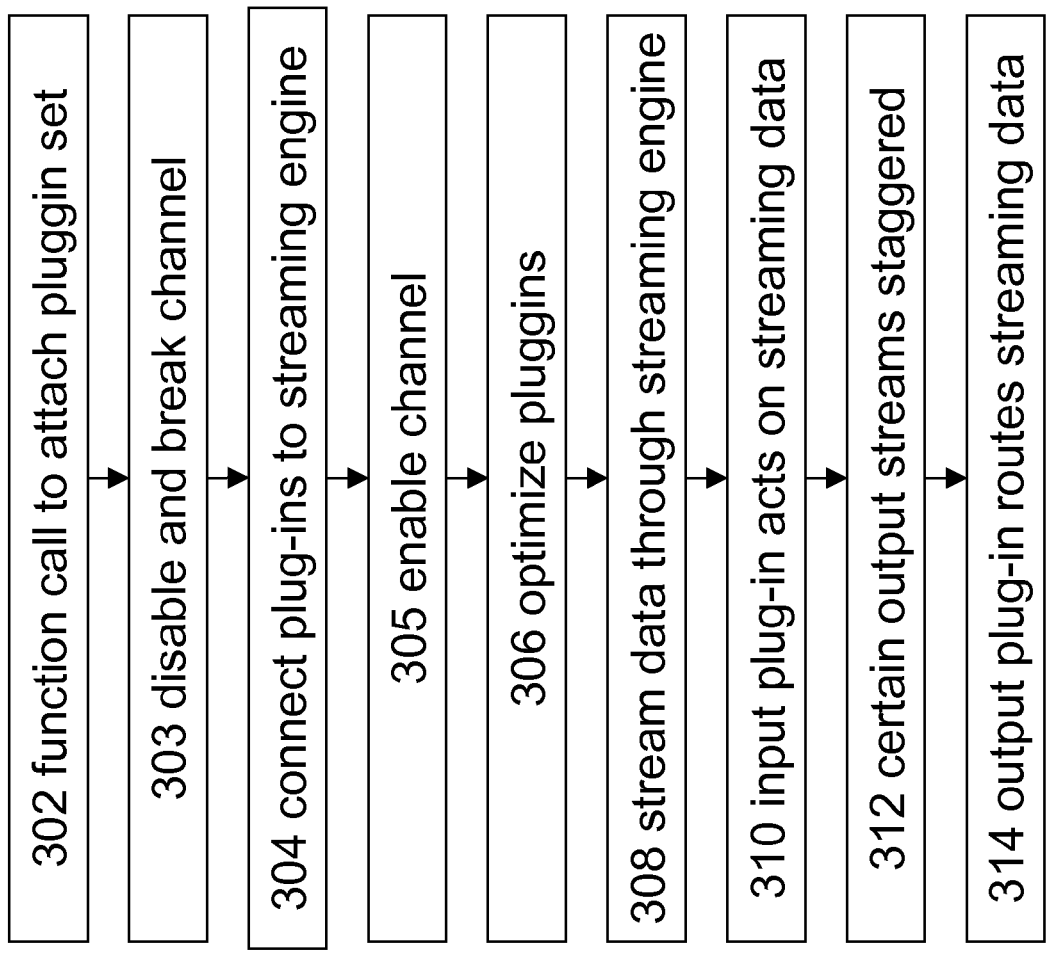
FIG. 3 is a schematic flow diagram of the method of the present embodiment.

The method of the present embodiment is described with respect to FIG. 3.

In step 302, an attach plug-in function call is made from the plug-in controller referencing the name of a plug-in set.

In step 303, a channel is identified and disabled so that streaming data can no longer stream through. At least one pair of break points are located on the channel and the channel is broken to produce at least one pair of break points. The number an location of break points are determined by the plug-in set definition. A channel need not be limited to a single streaming data path through the streaming engine but includes multiple paths as long as they are all connected.

In step 304, the attach plug-in function attaches each plug-in in the definition between the each pair of connection points.

In step 305, the channel is enabled.

In step 306, the attached plug-ins are configured by the configuration controller 28 according to the configuration rules 40 and then optimized by the configuration controller 28 according to the optimized configurations 42.

In step 308, data is streamed through the plug engine.

In step 310, the data is processed by an input plug-in.

In step 312, certain outputs streams are staggered by the stagger controller 30.

In step 314, the data is processed or passed through an output plug-in.

For example, an outbound RTP data stream requires a simple FIFO buffer, however an input RTSE requires a 'Jitter Buffer' to handle the fact that UDP packets containing RTP data may be delayed, lost or out of order. The configuration controller will detach one buffer and attach a more suitable buffer based on the type of input plug-in and the configuration rules 40.

In another example, a client application that needs to provide a full-duplex audio flow between itself and another client application on network, there would be two sets of plug-in objects, one handling the outbound and the other handling the inbound audio flow.

In a further example, a plug-in set can receive RTP packetized data from a network source, perform appropriate codec operations within an input plug-in and supply data back to the source via an output plug-in. It is possible to have one input plug-in with multiple output plug-ins for feeding to multiple sinks, for simultaneous recording, voice recognition and monitoring (see FIG. 1). This configuration would use a switch plug-in to split the single input into multiple outputs. The use of object-oriented programming means that users can write their own plug-in and buffer types for which much of the behaviour can be inherited from generic objects.

The invention claimed is:

1. A method for controlling streaming data in a streaming data engine comprising:
    identifying an existing streaming data channel and disabling the channel so that data cannot be streamed;
    breaking the channel at least at one point to form at least one pair of channel connection points;
    connecting at least one streaming data plug-in between the at least one pair of connection points so that the channel is remade;
    enabling the channel so that streaming data can flow through the channel via the at least one plug-in, wherein the at least one plug-in can process the streaming data as it flows through the channel;
    in response to the at least one plug-in attached to the streaming data engine failing to comply with one or more plug-in configuration rules, disabling the channel and reconfiguring the streaming data engine so that the at least one plug-in complies with the configuration rules; and
    in response to the at least one plug-in attached to the streaming data engine failing to comply with one or more plug-in optimization rules, disabling the channel and reconfiguring the streaming data engine so that the at least one plug-in complies with the optimization rules.

2. The method according to claim 1, wherein reconfiguring the streaming data engine comprises detaching a plug-in and attaching a new plug-in that complies with the plug-in configuration rules.

3. The method according to claim 1, wherein the disabling, breaking, connecting and enabling steps are performed at execution time using at least one application programming interface call.

4. The method according to claim 1, wherein a plug-in is an input plug-in for manipulating streaming data at an input to the streaming data engine.

5. The method according to claim 1, wherein a plug-in is an output plug-in for manipulating streaming data at an output to the streaming data engine.

6. The method according to claim 1, wherein a plug-in is a buffer plug-in for buffering streaming data between an input and output of the streaming data engine.

7. The method according to claim 1, wherein a plug-in is a mixer plug-in for connecting and mixing one or more streaming channel inputs with one or more streaming channel outputs.

8. The method according to claim 7, wherein the mixer plug-in splits a single streaming channel input into multiple channels of output.

9. The method according to claim 7, wherein the mixer plug-in mixes multiple channels of input into a single channel of output.

10. The method according to claim 7, wherein the mixer plug-in has more than one output plug-in; further comprising selecting the output plug-in appropriate to the input data stream.

11. The method according to claim 1, further comprising:
    attaching a further output plug-in to the channel;
    wherein the streaming data is fed to both an original output plug-in and the further attached output plug-in.

12. The method according to claim 1, wherein an interactive voice response application instigates the attaching of the plug-ins to a plug-in engine through an API.

13. The method according to claim 1, wherein a user instigates the attaching of plug-ins to a plug-in engine through a user interface.

* * * * *